US011439173B1

(12) United States Patent
Lele et al.

(10) Patent No.: US 11,439,173 B1
(45) Date of Patent: Sep. 13, 2022

(54) LOW ALLERGENICITY WELL COOKED FOOD POWDER

(71) Applicant: LIL MIXINS, LLC, Philadelphia, PA (US)

(72) Inventors: Meenal Lele, Philadelphia, PA (US); James Petitti, El Segundo, CA (US)

(73) Assignee: LIL MIXINS, LLC, Philadelphia, PA (US)

( * ) Notice: Subject to any disclaimer, the term of this patent is extended or adjusted under 35 U.S.C. 154(b) by 0 days.

(21) Appl. No.: 17/481,394

(22) Filed: Sep. 22, 2021

(51) Int. Cl.
| | |
|---|---|
| *A23C 7/04* | (2006.01) |
| *A23L 33/19* | (2016.01) |
| *A23L 33/00* | (2016.01) |
| *A23L 5/30* | (2016.01) |
| *A23L 5/00* | (2016.01) |
| *A23C 9/16* | (2006.01) |

(52) U.S. Cl.
CPC ............... *A23L 33/19* (2016.08); *A23C 9/16* (2013.01); *A23L 5/30* (2016.08); *A23L 5/55* (2016.08); *A23L 33/40* (2016.08); *A23C 2210/10* (2013.01)

(58) Field of Classification Search
CPC .... A61K 39/35; A61K 9/0095; A61K 38/018; A23V 2002/00; A23V 2200/324; A23V 2200/304; A23V 2250/54246; A23V 2250/612; A23V 2250/5424; A23L 33/40; A23L 33/19; A23L 5/00; A23L 2/39; A23C 3/00; A23C 3/07; A23C 2210/10; A23C 3/02; A23C 3/04; A23C 7/04; A23C 1/12; A23C 1/08; A23C 9/16
See application file for complete search history.

(56) References Cited

U.S. PATENT DOCUMENTS

| | | | |
|---|---|---|---|
| 233,750 A | 10/1880 | Halvorson | |
| 1,630,756 A | 5/1927 | Parsons | |
| 1,891,887 A | 12/1932 | Clickner | |
| 2,139,696 A | 12/1938 | Reynolds | |
| 2,699,996 A | 1/1955 | Sargent | |
| 2,999,024 A | 9/1961 | Stimpson et al. | |
| 3,028,245 A | 4/1962 | Mink et al. | |
| 3,060,038 A | 10/1962 | Mancuso et al. | |
| 3,062,665 A | 11/1962 | Peebles | |
| 3,077,411 A | 2/1963 | Mitchell | |
| 3,082,098 A | 3/1963 | Bergquist | |
| 3,093,487 A | 6/1963 | Jones et al. | |
| 3,114,645 A | 12/1963 | Blanken et al. | |
| 3,170,804 A | 2/1965 | Kline et al. | |
| 3,174,866 A * | 3/1965 | Saperstein | A23C 11/04 426/656 |
| 3,393,074 A | 7/1968 | Ehrlich | |
| 3,720,253 A | 3/1973 | Ballas et al. | |
| 3,778,425 A | 12/1973 | Kandatsu et al. | |
| 3,881,034 A | 4/1975 | Levin | |
| 3,956,521 A | 5/1976 | Pisecky | |
| 4,279,932 A | 7/1981 | Koshida et al. | |
| 5,164,217 A | 11/1992 | Wong et al. | |
| 5,487,911 A | 1/1996 | Ueda et al. | |
| 5,736,181 A | 4/1998 | Bezner et al. | |
| 5,855,857 A | 1/1999 | Dithmer | |
| 6,149,964 A | 11/2000 | Theuer et al. | |
| 6,358,554 B1 | 3/2002 | Hagiwara et al. | |
| 6,579,551 B1 | 6/2003 | Theuer et al. | |
| 9,731,003 B2 | 8/2017 | Nadeau | |
| 9,913,488 B2 | 3/2018 | Book et al. | |
| 11,154,081 B1 | 10/2021 | Lele et al. | |
| 11,154,082 B2 | 10/2021 | Lele et al. | |
| 2004/0213885 A1 | 10/2004 | Bisson et al. | |
| 2009/0220674 A1 | 9/2009 | Katz et al. | |
| 2009/0238943 A1 | 9/2009 | Mukhopadhyay | |
| 2009/0317516 A1 | 12/2009 | Newsteder | |
| 2010/0255039 A1 | 10/2010 | Fritsche et al. | |
| 2014/0234501 A1 | 8/2014 | Sant | |
| 2015/0079233 A1 | 3/2015 | Calleja Araque et al. | |
| 2015/0305394 A1 | 10/2015 | Mazer | |
| 2016/0338400 A1 | 11/2016 | Avital et al. | |
| 2017/0056494 A1 | 3/2017 | Nadeau | |
| 2017/0367362 A1* | 12/2017 | Kreuss | A23J 1/207 |
| 2018/0020712 A1 | 1/2018 | Brown | |
| 2018/0214494 A1 | 1/2018 | Ohya et al. | |
| 2019/0167577 A1 | 6/2019 | Leitner et al. | |
| 2019/0343162 A1 | 11/2019 | Yepes et al. | |
| 2020/0170262 A1 | 6/2020 | Reed | |

(Continued)

FOREIGN PATENT DOCUMENTS

| | | |
|---|---|---|
| CN | 1033003 | 5/1989 |
| CN | 1086966 | 5/1994 |
| CN | 1142915 | 2/1997 |

(Continued)

OTHER PUBLICATIONS

Qian, Fang, Jiayue Sun, Di Cao, Yanfeng Tuo, Shujuan Jiang and Guangqing Mu, Experimental and Modeling Study of the Denaturation of Milk Protein by Heat Treatment, Korean Journal of Food Science of Animal Resources, 37(1): 44-51 (2017). (Year: 2017).*
Effects on Physical and Functional Properties of Dried Whole Eggs of Cassava (Manihot Esculenta Crantz) Starch Additive and Corn Syrup Additive; Masilungan-Manuel, Joanna Tess, Sino CL, Jarin AV, Vera FC; In 4th International Conference on Biotechnology and Environment Management 2014 (vol. 75, p. 47); LACSIT Press, Singapore; http://www.ipcbee.com/vol75/008-ICBEM2014-S1001.pdf.
How To Make Powdered Eggs; http://tacticalintelligence.net/blog/how-to-make-powdered-eggs.htm Erich/Prepper Academy.
Eggs—Beating Techniques for Egg Whites; Sarah Phillips; CRAFTY BAKING.com;https://www.craftybaking.com/howto/eggs-beating-techniques-egg-whites.
Feeding babies egg and peanut may prevent food allergy; Imperial College, London, Science Daily; Sep. 20, 2016; https://www.sciencedaily.com/releases/2016/09/160920112328.htm.

(Continued)

*Primary Examiner* — Hong T Yoo
(74) *Attorney, Agent, or Firm* — Gottlieb, Rackman & Reisman PC

(57) ABSTRACT

A nutritional or dietary supplement or food product is provided that may be eaten by children or adults. The food product is made from cow's milk that has been heat treated to selectively denature allergenic proteins contained therein.

13 Claims, No Drawings

(56) References Cited

U.S. PATENT DOCUMENTS

2020/0390133 A1  12/2020  Lele et al.

FOREIGN PATENT DOCUMENTS

| CN | 101690596 | 4/2010 |
|---|---|---|
| CN | 102613482 | 8/2012 |
| CN | 106165870 | 11/2016 |
| CN | 107969617 | 5/2018 |
| CN | 110122865 A | 8/2019 |
| EP | 0038684 B1 | 7/1984 |
| GB | 756643 A | 9/1956 |
| WO | 2018/057926 | 3/2018 |

OTHER PUBLICATIONS

Baked Milk—and Egg-Containing Diet in the Management of Milk and Egg Allergy; Leonard SA, Caubei JC, Kim JS, Groetch M, Nowak-Węgrzyn A.; The Journal of Allergy and Clinical Immunology: In Practice. Jan. 1, 2015;3(1):13-23; https://www.sciencedirect.com/science/article/abs/pii/S2213219814004188.

Watson, E; "Lil Mixins makes early introduction of potential allergens easy for parents", [Retrieved from the internet on Feb. 25, 2020]; https://www. food navigator-usa .com/ Article/20 18/08/27/lii-Mixins-makes-early-introduction-of-potential-allergens-easy-for-parents; p. 1. top and bottom; p. 2. picture and bottom: p. 3, top-middle; p. 4, top-middle; Aug. 27, 2018.

American Egg Board; Incredible Egg Cookings School—Soft Meringue; (The Incredible Egg) How to Make a Soft Merinque . . . Retrieved from: https:/www.incredibleegg.org/cooking-school/eggs-baking/make-soft-merinque/. Jun. 16, 2017.

Du Toit, et al.; Prevention of food allergy. J Allergy Clin Immunol.; London, United Kingsom; 137 (4). Apr. 2016.

International Search Report and Written Opinion, U.S. Patent and Trademark Office, corresponding Application No. PCT/US2020/023517, Jun. 18, 2020.

George N. Konstantinou, MD, MSC et al; Consumption of heat-treated egg by children allergic or sensitized to egg can affect the natural course of egg allergy . . . ; From the Allergy Department, Pediatric Hospital "P & A Kiriakou," National and Kapodistrian University of Athens, Athens, Greece. Letters to the Editor; Allergy lin Immunol., Aug. 2008; pp. 414-415.

Stephanie A. Leonard MD et al; Dietary Baked Egg Accelerates Resolution of Egg Allergy in Children; J. Allergy Clini. Immunol., Aug. 2012; 130 [2]pp. 473-480.

Stephanie A. Leonard MD et al; Dietary Baked Egg Accelerates Resolution of Egg Allergy in Children; American Academy of Allergy, Asthma & Immunology; 2012 http://dx.doi.org/10.1016/j.jaci.2012.06.006.

Zoubida Akkouche et al.; Effect of Heat on Egg White Proteins;International Conference on Applied Life Sciences (ICALS2012)/ISALS Turkey, Sep. 10-12, 2012.

Julie Wang, MD; Egg allergy: Clinical Features and Diagnosis—WOLTERS KLUWER; UpToDate; www.uptodate.com, Oct. 16, 2020.

Julie Wang, MD; Egg allergy: Management—UpToDate; WOLTERS KLUWER; UpToDate; www.uptodate.com, May 10, 2019.

Heather Lemon-Mule, MD; Immunologic changes in children with egg allergy ingesting extensively heated egg; [Food, drug, insect sting allergy, and anaphylaxis—Rapid Publication] American Academy of Allergy, Asthma & Immunology; doi:10.1016/j.jaci.2008.09.007; 2008.

Makiko Suzuki et al.; Lipocalin-Type Prostaglandin DSynthase and Egg White CystatinReact with IgE Antibodies fromChildren with Egg Allergy; Allergology International. 2010;59, No. 2: pp. 175-183.

Gustavo Martos, BS et al; Mechanism underlying differential food allergy response to heated egg; J Allergy Clin Immunol; vol. 127, No. 4; Apr. 2011; pp. 991-997.

Maresa Botha, MD.; Rual and urban food allergy prevalence from the South African Food Allergy; J Allergy Clin Immunol; vol. 143, No. 2; 2018 American Academy of Allergy, Asthma & Immunology https://doi.org/10.1016/j.jaci.2018.07.023; pp. 662-668.

Rachel L. Peters, PhD; The prevalence of food allergy and other allergic diseases in early childhood in a population-based study; J Allergy Clin Immunol; vol. 140, No. 1; Available online May 14, 2017. http://dx.doi.org/10.1016/j.jaci.2017.02.019; pp. 145-153.

Dohlman et al;Tolerance to cooked egg in an egg allergic popuation; Allergy Net; Accepted for publication Feb. 19, 2006; Allergy 2006: 61:899-901.

Love and Lemons NPL, https://www.loveandlemons.com/wprm_print/46490, Jun. 2020.

Lee Funke; How to Bake Eggs in the Oven, https://fitfoodiefinds.com/how-to-bake-eggs-in-oven, Feb. 25, 2021.

Farooq. Study of Thermal and Hydrolytic Denaturation of Casein. 2019. Journal of Animal and Plant Sciences. 29(1). pp. 141-148.

Nora. How to Bake a Cake in Microwave. Mar. 2021. https://violet.applebutterexpress.com/faq/how-to-bake-cake-in-microwave/.

Dixon. How to Thaw a Gallon of Milk. 2020. https://www.thebestestever.com/thaw-gallon-of-milk.html.

Percival. What is the Difference Between Fresh Milk and Powdered Milk? 2019. https://www.liquidline.co.uk/news/what-is-the-difference-between-fresh-milk-and-powdered-milk!.

Loveday. 2016. International Dairy Journal 52. pp. 92-100.

English Translation for CN110122865 published Aug. 2019.

Roberto J. Rona, FFPH; The prevalence of food allergy—a meta-analysis. J Allergy Clin Immunol 2007; 2007 American Academy of Allergy, Asthma & Immunology; doi:10.1016/j.jaci.2007.05.026; Jul. 12, 2007; pp. 638-646.

International Search Report and Written Opinion, U.S. Patent and Trademark Office, Application No. PCT/US2020/014246, dated Apr. 20, 2020.

John Michaelides; Baker's Journal, A Primer on Preservatives, https://www.bakersjournal.com/a-primer-on-preservatives-6271/, Aug. 2015.

How To Make Powdered Eggs; http://tacticalintelligence.net/blog/how-to-make-powdered-eggs.htm Erich/Prepper Academy Retrieved from the Internet on Jun. 17, 2019.

Beating Techniques for Stiff Peak Egg Whites; Sarah Phillips; CraftyBaking.com;https://www.craftybaking.com/howto/eggs-beating-techniques-egg-whites. Retrieved from the Internet on Mar. 4, 2022.

What you need to know about your microwave's WATTAGE—http://www.superb1.ca/Microwave%20Tips/microwave.pdf—Retrieved from the Internet on Jan. 27, 2022.

* cited by examiner

LOW ALLERGENICITY WELL COOKED FOOD POWDER

BACKGROUND OF THE INVENTION

As is known, food allergy rates have been on the rise over the last several years. Cow's milk allergy is one of the most common forms of food allergy, affecting around 1%-4% of young children in Western countries. IgE-mediated milk allergy is caused by an adverse immune reaction to one or more of the proteins in cow's milk. Most milk-allergic children (approximately 80%) outgrow the condition by the time of school age and develop clinical tolerance to cow's milk allergens.

The patterns of sensitization to individual cow's milk proteins varies significantly by study population and age. Approximately 61% of cow's milk reactive individuals are sensitized to the Bos d 5 (beta-lactoglobulin, otherwise indicated as "β-lactoglobulin") protein and approximately 57% are sensitized to the Bos d 11 (beta-casein, otherwise indicated as "β-casein") protein. These proteins represent two of the major allergens in milk and constitute approximately 9% and 26%, respectively, of total milk protein.

The observation in the art that children who consumed extensively heated (baked) milk products subsequently became tolerant to milk changed the paradigm for treatment of milk allergy. Consumption of baked milk products apparently accelerated the development of tolerance to milk and was associated with reduced IgE antibody responses to milk allergens. Indeed, approximately 70%-75% of children treated with baked milk products ultimately were able to tolerate such products.

Previous studies have investigated the effects of baking, following a specific recipe that includes: 1. Mixing pasteurized or raw milk with oil, flavoring and egg. 2. Mixing flour, sugar, salt and baking powder. 3. Adding the dry ingredients to the liquid ingredients and stirring. 4. Dividing the batter, and heating at 350 F 30-35 minutes until firm to the touch.

A recent study using new monoclonal antibodies in order to measure the IgE-binding levels of Bos d 5 and Bos d 11 in milk products resulting from a muffin "baking" recipe showed that allergenic Bos d 5 was reduced from 680 μg/g in uncooked muffin mix to 0.17 μg/g in baked muffins, representing a greater than 99% decrease after baking. Conversely, allergenic Bos d 11 levels in baked muffins remained high and only decreased by 30% from a mean of 4249 μg/g in an uncooked muffin mix to 2961 μg/g when baked (~181 mg Bos d 11 per muffin). Significantly, baked muffins retained—70% of the IgE binding to uncooked muffin mix.

Baked muffin extract inhibited IgE binding to uncooked muffin mix by up to 80%, demonstrating retention of IgE reactivity.

The need therefore exists for an infant safe well-cooked milk food product that can provide uniform and desired levels of total and allergenic milk proteins to infants.

SUMMARY OF THE INVENTION

Generally speaking, in accordance with an aspect of the present invention, a nutritional or dietary supplement or food product is provided that may be eaten by children or adults. The food product is made solely of cow's milk that has been extensively heat treated in order to selectively denature the allergenic proteins in the milk. This, in turn, substantially reduces the amount of micrograms of allergenic protein per gram of milk, the reduction being at least 25% and up to 100% of their initial concentration in the milk. In other words, the heat treated milk contains between about 0% to about 75% of its allergenic proteins as compared to what it contained prior to the heat treating process. The total and allergenic protein content in the heat treated milk is typically measured by analytic techniques such as SDS-PAGE or ELISA, as is well known on the art.

It is therefore an object of the invention to provide an improved cow's milk food product for infants or babies.

Another object of the present invention is to provide a cow's milk food product that has a desired amount of specific proteins in both allergenic and denatured forms.

A further object of the invention is to provide a cow's milk food product that is easy for an infant or baby to eat and digest.

Yet another object of the invention to create an improved cow's milk food product with a texture that is developmentally appropriate for an infant as young as 4 months old.

Still a further object of the invention is to provide a cow's milk food product that has reduced allergenic bos d 11 and bos d 5 protein levels without incorporating the use of other ingredients, enzymes, or preservatives.

Another object of the invention is to provide a cow's milk food product that is shelf-stable at room temperature for at least 6 months.

A further object of the invention is to provide a powdered cow's milk food product that is water soluble.

Still other objects and advantages will be obvious from the following description.

DETAILED DESCRIPTION

The inventive process begins with obtaining pasteurized or raw cow's milk or dehydrated cow's milk that has been reconstituted. Dehydrated cow's milk that has been reconstituted may include, for example, evaporated milk in liquid form to which water was subsequently added in order to bring the milk/water mixture to a nutritional content ratio of the milk that is substantially the same as pre-evaporation, powdered milk that was subsequently mixed with water, or a mixture thereof. The pasteurized, raw or reconstituted milk may be provided in liquid form or frozen. When the cow's milk is obtained in frozen form, it is typically first thawed before continuing to the next step. Cow's milk in this step may also include a mixture of raw, pasteurized, and/or reconstituted milk.

The next step in the inventive process includes heating the cow's milk in order to produce a well-cooked milk product (in liquid form). The heating process will denature the allergenic proteins contained in milk, including, for example, the bos d 11 (beta-casein, or β-Casein) and bos d 5 (beta-lactoglobulin, or β-Lactoglobulin) proteins. Denatured bos d 11 and bos d 5 proteins are substantially non-allergenic.

For example, the heating process will denature from about 25% to 100% of the bos d 11 protein and from about 25% to 100% of the bos d 5 protein initially present in the milk prior to the heating step. In other words, the well-cooked cow's milk will contain from about 0% to about 75% of its initial amount of allergenic (e.g., non-denatured) bos d 11 protein and from about 0% to about 75% of its initial amount of allergenic bos d 5 protein.

One example of producing well-cooked cow's milk according to the present invention is to heat cow's milk until it reaches a temperature in the range of from about 165 F to about 212 F. Once the milk is heated to this temperature range, the temperature of the milk is maintained in the range of about 165 F to about 212 F for about 5 to about 30 minutes, and preferably, between about 10 minutes to about 30 minutes. For example, the milk can be boiled for about 10 minutes to about 30 minutes. This process will denature from about 25% to about 100% of the bos d 11 protein in milk and from about 25% to about 100% of the bos d 5 protein. Therefore, cow's milk that has been heated in carrying out the inventive process and in accordance with the times and temperatures listed above will contain from about 0% to about 75% of its initial allergenic (e.g., non-denatured) bos d 11 protein content and from about 0% to about 75% of its initial allergenic bos d 5 protein content.

The cow's milk may be allowed to cool down to room temperature subsequent to the heating process.

The next step includes mixing the well-cooked cow's milk with water. This can be done, for example, by utilizing a suitable high shear mixer, blender or agitator until the mixture is homogenous. Water should be added to the well-cooked milk continuously while mixing is occurring until the mixed and diluted milk contains preferably no more than approximately 14% solids, but no less than approximately 5% solids by weight. Mixing should be carried out without the addition of heat or some other pasteurization step that would otherwise affect the proteins in the cow's milk. The resulting mixed, well-cooked cow's milk solution should be homogenous, meaning that it can pass through at least a 1620 mesh screen (US Standard mesh size), and have a viscosity in the range of 1800-10600 cp.

The next step in the process includes drying the well-cooked, diluted milk product in order to produce a dry powder milk product. The well-cooked liquid milk product (e.g., the diluted milk) may be continuously agitated (or mixed) prior to drying in order to maintain homogeneity and to ensure that the proteins and other nutrients in the milk product are evenly dispersed.

The drying process must be kept aseptic at all times by using sanitizing equipment and good manufacturing procedures. Drying may be performed by using a spray dryer that is operated at a preferred pressure of about 20 to 40 psi, with an inlet temp of about 160 C-195 C, and outlet temperature of about 60 C-90 C. Spray drying pushes the liquid milk product through a nozzle, and the nozzle has holes that determine the size of the particles that exit therefrom. The resulting dried milk powder should have particle sizes ranging from about 60 mesh to about 200 mesh (U.S. standard mesh size).

Alternatively, drying may be carried out by using a drum drier, a dehydrator, or a freeze-dryer. However, drying by means of a drum dryer, dehydrator or freeze-dryer will require the use of a milling or grinding step after the drying process in order to reduce the size of the dried milk powder particles to a range of about 60 and 200 mesh.

The dried milk powder produced by the inventive process (which may be also referred to as a well-cooked cow's milk powder product) should be at least 90% water soluble as measured through a 20 mesh screen (no more than 10% of the particles are caught in the screen).

The dried, well-cooked milk powder can be safely fed to infants as young as 4 months old and to adults alike. The dried, well-cooked milk powder product of the invention is preferably fed to infants 1-3 times per week in serving sizes of about 0.5 g to about 5 g of protein so as to provide beneficial nutrients to infants as well as help them outgrow their allergenicity to cow's milk products. The dried, well-cooked milk powder product may be analyzed in a laboratory to determine its protein content per gram of powder product. The protein content amount of the powder may be indicated in the packaging that is utilized to store, contain, sell, etc., the well-cooked egg powder product such that a consumer can manually determine how much powder product to utilize based on the desired or preferred protein content per serving.

The dried, well-cooked milk powder is intended to be mixed with water or a liquid food prior to being fed to infants. For example, the dried, well-cooked milk powder that results from the steps above can be mixed with water to form a liquid milk solution, or it can be mixed with breastmilk, formula, a pureed food, etc.

Allergic infants as young as 4 months of age who are fed with a milk solution made by mixing water with the well-cooked milk powder of the present invention or with liquid foods fortified with the well-cooked milk powder of the present invention are likely to outgrow their allergenicity to cow's milk products more rapidly than others and are more likely to develop a clinical tolerance to cow's milk allergens than allergic infants who are not fed with the milk solution or fortified liquid food. In addition, allergy to cow's milk food products can be prevented by feeding infants as young as 4 months old with a milk solution made by mixing water with the well-cooked milk powder of the present invention or with liquid foods fortified with the well-cooked milk powder of the present invention.

The protein content and content of other nutrients in the well-cooked milk powder product can be determined by using conventional methods known to those skilled in the art, for example, by conducting a protein analysis of the powder.

Advantageously, the concentration of proteins and other nutrients throughout the well-cooked powdered milk product will be substantially uniform since the well-cooked dried milk powder product is homogeneous in nature and because the well-cooked milk was mixed immediately prior to the drying step. Therefore, when a batch of well-cooked, dried milk powder produced in accordance with the present invention is divided into, for example, equal rations (by weight or volume), the rations will have virtually the same amount of protein and other nutrients as one another.

A well-cooked powered milk product produced in accordance with the present invention is advantageous because the individual granules that make up the powdered milk product exhibit excellent water absorption and water adhesion characteristics. Therefore, the powdered milk product of the present invention can be easily mixed with water and with an infant food in liquid form as described above.

Further, due to the heating, mixing and drying steps described above, the individual granules that make up the powdered milk are stable, and as a result, have a tendency to not adhere to one another when mixing them with water, breastmilk, formula, pureed foods, or other liquid foods. This will prevent the granules from forming a gel or a solid clump of material when being mixed with water or a liquid food. Since the consumption of gelatinous matter and/or solid clumps of material by infants poses a choking hazard, the stable nature of the granules of the powdered milk product of the present invention is advantageous because it will virtually prevent the formation of gelatinous matter and/or solid clumps of material when mixed with water or other liquids.

Further, the powdered cow's milk product produced in accordance with the invention is advantageous because it has a long shelf life, for example, at least 6 months.

Optionally, the well-cooked, powdered cow's milk produced in accordance with the inventive steps described above may be heated to denature at least some of the allergenic bos d 11 and bos d 5 proteins that may still be present in it. This heating step (which may be referred to as a "second" heating step or a "powder" heating step since the product being heated is in powder form, as opposed to the liquid milk described in the first heating step above) may include, for example, placing the well-cooked, powdered cow's milk product in a chamber heated to about 212 F-400 F for a period of from about 3 minutes to about 30 minutes.

The powder heating step may include periodic or continuous stirring of the well-cooked, powdered milk product in order to distribute the heat evenly throughout the powder. Advantageously, the dry heating step is effective at denaturing protein(s) that are more resistant to denaturing during the first heating step (when heating the liquid milk). For example, the dry heating step is more effective at denaturing the bos d 11 protein than the first heating step. Therefore, the dry heating step will denature a significant amount of allergenic bos d 11 protein that may still exist in the dry powdered milk product produced using the inventive method.

In addition, the dry heating step will also denature at least a portion of other proteins (e.g., bos d 5) in the milk powder that were not denatured from the first heating step (if any exist).

Therefore, the dry heating step ensures that the levels of allergenic bos d 5 and/or bos d11 that may persist will be very low.

The powder heating step will not change the particle size of the granules that make up the powdered milk product. The powder heating step may reduce the water content of the powdered milk product, and may also reduce the water solubility of the powdered milk, such that the product is in the range of about 70% to about than 90% water soluble as measured through a 20 mesh screen.

The scope of the invention will now be set forth in the following claims.

What is claimed is:

1. A method of producing an infant or baby food product comprising:
    heating cow's milk at a temperature of from about 165 F to about 212 F for a time period ranging from about 5 to about 30 minutes to denature from about 25% to about 100% of the amount of at least one allergenic protein contained therein;
    allowing the heated milk to cool;
    mixing the cooled milk with water in order to produce a diluted and homogeneous milk product;
    drying the diluted and homogenous milk product in order to produce a dried milk powder product; and
    heating the dried milk powder product at a temperature of about 212 F to about 400 F for about 3 minutes to about 30 minutes.

2. The method of claim 1, wherein the at least one allergenic protein that is denatured from the heating step is selected from the group consisting of Bos d 5 (beta-lactoglobulin) and Bos d 11 (beta-casein).

3. The method of claim 1, wherein the drying step is carried out by using a spray dryer that is operated at a pressure of about 20 to about 40 psi, with an inlet temp of about 160 C-195 C, and outlet temperature of about 60 C-90 C.

4. The method of claim 1, wherein the dried milk powder product that is produced following said drying step has a particle size of between about 60 mesh and 200 mesh.

5. The method of claim 1, wherein the diluted and homogeneous milk product that is produced by the mixing step contains between about 5% and 25% solids by weight.

6. The method of claim 1, wherein the mixing step is carried out without the addition of heat.

7. The method of claim 1, wherein the diluted and homogeneous milk product that is produced by the mixing step is configured to pass through at least a 1620 mesh screen and has a viscosity in the range of 1800-10600 cp.

8. The method of claim 1, wherein the drying step is carried out by using a drum dryer, a dehydrator or a freeze-dryer.

9. The method of claim 8, further comprising the step of milling or grinding the dried milk powder product after the drying step in order to reduce a size of individual particles that make up the dried milk powder product to a range of about 60 mesh to about 200 mesh.

10. The dried milk powder product produced by the method of claim 1.

11. A method for reducing the risk of developing a food allergy to cow's milk, the method comprising preparing a dried milk powder product in accordance with the steps of claim 1 and feeding said food product to a baby or infant of an age of at least four months old.

12. The method of claim 11, further including mixing the dried milk powder product into water or into a food selected from the group consisting of breastmilk, formula and a pureed food prior to the feeding step.

13. The method of claim 11, wherein the feeding step is carried out in pre-measured servings of the dried milk powder product at a frequency of 1-3 times per week, each pre-measured serving containing from about 0.5 g to about 5 g of milk protein.

* * * * *